(12) United States Patent
Harding et al.

(10) Patent No.: US 8,481,130 B2
(45) Date of Patent: *Jul. 9, 2013

(54) ALIGNMENT LAYER WITH REACTIVE MESOGENS FOR ALIGNING LIQUID CRYSTAL MOLECULES

(75) Inventors: Richard Harding, Hants (GB); Alison Linda May, Dorset (GB); Simon Greenfield, Dorset (GB); Johan Lub, Valkenswaard (NL); Ciska Doornkamp, Eindhoven (NL); Rene Theodorus Wegh, 's-Hertogenbosch (NL)

(73) Assignee: MERCK PATENT GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,733

(22) Filed: Sep. 13, 2012

(65) Prior Publication Data

US 2013/0012654 A1    Jan. 10, 2013

Related U.S. Application Data

(63) Continuation of application No. 10/567,552, filed as application No. PCT/EP2004/008340 on Jul. 26, 2004.

(30) Foreign Application Priority Data

Aug. 8, 2003 (EP) .................................... 03017588

(51) Int. Cl.
*C09K 19/56* (2006.01)
*G02F 1/1337* (2006.01)

(52) U.S. Cl.
USPC ........... 428/1.2; 428/1.26; 349/123; 349/135; 427/162; 252/299.01

(58) Field of Classification Search
USPC ...... 428/1.2, 1.26; 349/123, 135; 252/299.01, 252/299.4; 427/162
See application file for complete search history.

(56) References Cited

U.S. PATENT DOCUMENTS

| | | | |
|---|---|---|---|
| 2,875,053 A | 2/1959 | Minsk |
| 3,619,461 A | 11/1971 | Gay |
| 4,106,941 A | 8/1978 | Scullard |
| 4,451,551 A | 5/1984 | Kataoka |
| 4,839,405 A | 6/1989 | Speelman |
| 4,842,665 A | 6/1989 | Taguchi |
| 4,855,184 A | 8/1989 | Klun |
| 4,880,895 A | 11/1989 | Higashi |
| 4,911,958 A | 3/1990 | Mochizuki |
| 4,944,576 A | 7/1990 | Lacker |
| 4,984,873 A | 1/1991 | Takiguchi |
| 5,000,545 A | 3/1991 | Yoshioka |
| 5,099,344 A | 3/1992 | Tsuboyama |
| 5,298,590 A | 3/1994 | Isogai |
| 5,405,552 A | 4/1995 | Jungbauer |
| 5,426,009 A | 6/1995 | Coates |
| 5,602,661 A | 2/1997 | Schadt |
| 5,700,860 A | 12/1997 | Nishikawa |
| 5,770,107 A | 6/1998 | Hassall |
| 5,806,834 A | 9/1998 | Yoshida |
| 5,808,716 A | 9/1998 | Gass |
| 5,814,378 A | 9/1998 | Onishi |
| 5,953,091 A | 9/1999 | Jones |
| 5,989,758 A | 11/1999 | Komatsu |
| 6,001,277 A | 12/1999 | Ichimura |
| 6,008,873 A | 12/1999 | Swirbel |
| 6,042,745 A | 3/2000 | Coates |
| 6,055,096 A | 4/2000 | Michihata |
| 6,106,906 A | 8/2000 | Fujiwara |
| 6,128,058 A | 10/2000 | Walton |
| 6,201,588 B1 | 3/2001 | Walton |
| 6,239,853 B1 | 5/2001 | Winker |
| 6,300,994 B1 | 10/2001 | Ohe |
| 6,320,634 B1 | 11/2001 | Winker |
| 6,344,154 B1 | 2/2002 | Coates |
| 6,383,579 B1 | 5/2002 | Park |
| 6,399,165 B1 | 6/2002 | Kwon |
| 6,449,093 B2 | 9/2002 | Hebrink |
| 6,538,712 B1 | 3/2003 | Winker |
| 6,630,973 B1 * | 10/2003 | Matsuoka et al. ............ 349/117 |
| 6,764,724 B1 | 7/2004 | Nam |
| 6,805,920 B2 | 10/2004 | Nakano |
| 6,939,587 B1 | 9/2005 | Kumar |
| 7,163,723 B2 | 1/2007 | Tanaka |
| 7,364,671 B2 | 4/2008 | Schadt |
| 7,379,131 B2 | 5/2008 | Ito |
| 2002/0145691 A1 | 10/2002 | Ito |
| 2002/0187283 A1 | 12/2002 | Gu |
| 2003/0021913 A1 | 1/2003 | O'Neill |
| 2003/0080326 A1 | 5/2003 | Schunk |
| 2003/0103172 A1 | 6/2003 | Ohe |
| 2003/0152712 A1 | 8/2003 | Motomura |
| 2003/0190437 A1 | 10/2003 | Verrall |
| 2003/0236418 A1 | 12/2003 | Hong |

FOREIGN PATENT DOCUMENTS

| | | |
|---|---|---|
| EP | 1160618 | 12/2001 |
| JP | 2001226495 | 8/2001 |
| WO | WO 0118594 | 3/2001 |

OTHER PUBLICATIONS

"Material Safety Data Sheet, Polyvinyl alcohol MSDS", Science Lab.com, Chemical & Laboratory Equipment, Jun. 9, 2012.*
Saxena, S.K. "Polyvinyl Alcohol (PVA)" Chemical and Technical Assessment, (2004).
"Material Safety Data Sheet, Polyvinyl alcohol MSDS," Science Lab.com, Chemical & Laboratory Equipment, Jun. 9, 2012.
Hamilton, D.L. "Methods of Conserving Archaeological Material from Underwater Sites," Texas A& M University (1999).

* cited by examiner

*Primary Examiner* — Sophie Hon
(74) *Attorney, Agent, or Firm* — Millen, White, Zelano & Branigan, P.C.

(57) ABSTRACT

The invention relates to an alignment layer with improved adhesion to liquid crystal (LC) films, to a precursor material used for the preparation of such a layer, to a laminate comprising such a layer and at least one LC polymer film, and to the use of the alignment layer and the laminate for optical, electrooptical, decorative or security uses and devices, wherein the alignment layer and the precursor material comprise at least one reactive mesogen in monomeric, oligomeric or polymeric form.

24 Claims, No Drawings

ALIGNMENT LAYER WITH REACTIVE MESOGENS FOR ALIGNING LIQUID CRYSTAL MOLECULES

This application is a continuation of Ser. No. 10/567,552, filed Feb. 8, 2006 (now allowed), which is a 371 application of International patent application No. PCT/EP2004/008340, filed Jul. 26, 2004, which claims the benefit of European patent application No. EP 03017588.9, filed Aug. 8, 2003.

FIELD OF INVENTION

The invention relates to an alignment layer with improved adhesion to liquid crystal (LC) films, to a precursor material used for the preparation of such a layer, to a laminate comprising such a layer and at least one LC polymer film, and to the use of the alignment layer and the laminate for optical, electrooptical, decorative or security uses and devices.

BACKGROUND AND PRIOR ART

Polymerisable liquid crystal (LC) materials are commonly used for the preparation of optical films in liquid crystal displays. These materials usually contain a certain amount of compounds with two or more polymerisable groups (di- or multi-functional), which are crosslinked to give a hard film.

However, during polymerisation certain polymerisable materials, like for example acrylates, suffer polymer shrinkage [see R. A. M. Hikmet, B. H. Zwerver and D. J. Broer *Polymer* (1992), 33, 89]. This shrinkage places a lot of strain in the polymerised film and acts to reduce the adhesion between the film and the substrate.

One technique reported in prior art to overcome this problem concentrates on modifying the substrate to improve its adhesion to the polymerised film. For example, the substrate can be subjected to special treatment, for example flame treatment as disclosed in U.S. Pat. No. 2,795,820 or GB 0 788 365, corona treatment as reported in DE 195 80 301, or plasma treatment as reported in R. L. Bersin *Adhesives Age* (1972) 15, 37.

Alternatively, a separate adhesion or coupling layer (typically a solution of organo-silane materials) can be coated onto the substrate to help increase adhesion of a polymer film to a substrate, like e.g. the commercially available Addid 900® (from Wacker GmbH, Burghausen, Germany), an aminofunctional trimethoxy silane.

U.S. Pat. No. 5,631,051 discloses a method of preparing an optical compensation sheet on a transparent substrate of triacetyl cellulose (TAC), by first providing an adhesion layer of gelatine on the TAC film. Then an aligning layer is formed by coating a solution of denaturated polyvinyl alcohol (PVA), which was chemically modified by addition of polymerizable groups, onto the gelatine layer, evaporating the solvent and rubbing the surface of the polymerised PVA layer unidirectionally, Finally an optically anisotropic layer comprising discotic LC material is coated onto the rubbed surface of the PVA layer and polymerised.

U.S. Pat. No. 5,747,121 discloses a method of preparing an optical compensation sheet by coating a solution of denaturated polyvinyl alcohol (PVA), which was chemically modified by addition of polymerizable groups, onto a transparent substrate, evaporating the solvent and rubbing the surface of the PVA layer unidirectionally. Then an optically anisotropic layer comprising discotic LC material is coated onto the rubbed surface of the PVA layer and polymerised. Afterwards the film is subjected to heat treatment whereby the PVA layer and the discotic LC layer are reported to be chemically bonded to each other via free, crosslinkable groups.

However, all of the above methods have a distinct disadvantage in that they involve an extra processing step. Furthermore, the use of separate adhesion or aligning layers comprising isotropic materials like gelatine or PVA can negatively influence the performance of the liquid crystal film when used e.g. as optical film.

To overcome this problem an adhesion promoter can be directly added to the polymerisable LC Material formulation. Addid 900®, or a similar material, is a typical additive. However, when these materials are added to polymerisable LC mixtures it is often difficult to obtain well aligned films, such as those required for optical films.

In particular films or coatings of polyimide (PI), which are commonly used as alignment layers to induce uniform orientation of the LC material provided thereon, often have only low adhesion to the polymerised LC material.

Therefore, there is a need for an advantageous method to improve the adhesion of a film or coating, which is used as alignment layer for LCs, to an LC polymer film. The method should not negatively affect the optical and mechanical properties of the alignment layer, like its transmission and its stability against temperature, mechanical stress and solvents.

It was an aim of the present invention to provide such a method. Another aim of the present invention was to provide an alignment layer having improved adhesion whilst not affecting its optical and mechanical properties. Other aims are immediately evident to the expert from the following description.

The inventors of the present invention have found that the above mentioned drawbacks of prior art methods can be overcome by using an alignment layer that is obtainable from a precursor material comprising a low amount of a polymerisable mesogenic compound (reactive mesogen). This compound improves adhesion of the alignment layer, in particular when used as substrate or alignment layer for an LC polymer provided thereon, whilst of negatively affecting its optical and mechanical properties.

DEFINITION OF TERMS

The term 'film' includes self-supporting, i.e. free-standing, films or layers of material that show more or less pronounced mechanical stability and flexibility, as well as coatings or layers on a supporting substrate or between two substrates.

The term 'liquid crystal or mesogenic material' or 'liquid crystal or mesogenic compound' includes materials or compounds comprising one or more rod-shaped, board-shaped or disk-shaped mesogenic groups, i.e. groups with the ability to induce liquid crystal phase behaviour. Liquid crystal (LC) compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal (abbreviated LC) material is used for both liquid crystal materials and mesogenic materials, and the term 'mesogen' is used for the mesogenic groups of the material.

The term 'reactive mesogen' (RM) means a polymerisable mesogenic compound.

3

The term 'non-mesogenic compound or material' means a compound or material that does not contain a mesogenic group as defined above.

SUMMARY OF THE INVENTION

The invention relates to an alignment layer, preferably a solvent processed film, which is suitable for aligning liquid crystal (LC) molecules, characterized in that it comprises at least one reactive mesogen (RM) in monomeric, oligomeric or polymeric form.

The invention further relates to an alignment layer, preferably a solvent processed film, which is suitable for aligning liquid crystal (LC) molecules, characterized in that it is obtainable from a precursor material comprising at least one reactive mesogen (RM).

The invention further relates to a precursor material comprising at least one RM as described above and below.

The invention relates to the use of an alignment layer as described above and below as substrate and/or alignment layer of liquid crystal (LC) materials, in particular of polymerisable or polymerised LC materials.

The invention further relates to a laminate comprising an alignment layer as described above and below and further comprising a film comprising polymerised or crosslinked LC material.

The invention further relates to a method of preparing a laminate as described above and below by.
   providing a layer of a polymerisable LC material onto an alignment layer as described above and below,
   optionally aligning the LC material into uniform orientation,
   polymerising the LC material.

The invention further relates to the use of a precursor material, an alignment layer or laminate according to the present invention in optical, electrooptical, information storage, decorative and security applications.

The invention further relates to an optical component or device comprising a precursor material, alignment layer or laminate according to the present invention.

The invention further relates to a liquid crystal display comprising a precursor material, aligns gent layer or laminate according to the present invention.

The invention further relates to an authentification, verification or security marking or a coloured image comprising a precursor material, alignment layer or laminate according to the present invention.

4

The invention further relates to an object or document of value comprising an authentification, verification or security marking or an image as described above and below.

DETAILED DESCRIPTION OF THE INVENTION

For the alignment layers according to the present invention in principle all polymer films or substrates can be used that are known to the expert, and are suitable as aligning layers. Especially preferred are solvent processed films, for example solutions of polyimide or films of TAC cast from an organic solution, e.g. in dichloromethane.

Solvent processing is typically carried out by depositing a solution of the polymer that serves as aligning material, like for example TAC or polyimide, dissolved in a suitable solvent, for example an organic solvent like dichloromethane, and slowly evaporating off the solvent to produce a film of the polymer which is not under stress and so has virtually no birefringence. This method is known to the expert and described in the literature, for example in JP 08-258065 A.

The alignment layer according to the present invention is characterized in that it comprises a limited amount of reactive mesogens (RMs), which improve the adhesion of a subsequent LC layer coated onto the alignment layer. However, the present invention does not include alignment layers or precursor materials that do essentially consist of RMs or LC polymers, like for example those disclosed in WO 02/44801 or the references cited therein.

Thus, the amount of RMs in an alignment layer or precursor material according to the present invention is generally less thin 50 wt %, preferably less than 20 wt. %, very preferably less than 10 wt. %, most preferably less than 5 wt %. The birefringence. An of an alignment layer or a precursor material according to the present invention is preferably less than 0.05, very preferably less than 0.01, more preferably less than 0.005, most preferably less than 0.001.

Further preferred is an alignment layer or precursor material which, before addition of the reactive mesogens, is non-mesogenic or optically isotropic or only slightly optically anisotropic. 'Slightly optically anisotropic' means that the birefringence Δn is <0.01.

The alignment layer does not necessarily have to be a polymer film. It is also possible for example to use a self-assembled monolayer or multilayer as alignment layer.

Particularly preferred are the following alignment layers:
(1) Polyimide films obtained from a solution of a polyimide precursor, for example a solution comprising monomers and/or oligomers which upon polymerisation e.g. by heating yield a polyimide film, especially preferably wherein the precursor solution comprises at least one RM of the following formulae

I

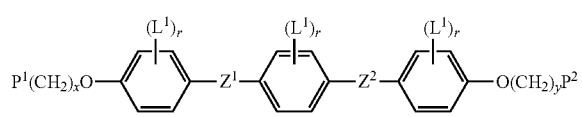

II

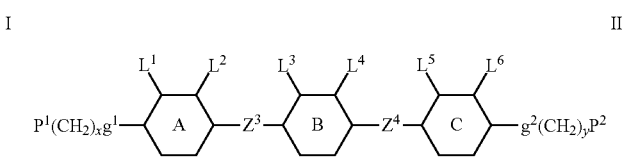

III

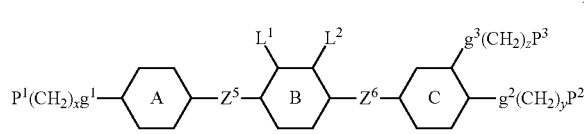

IV

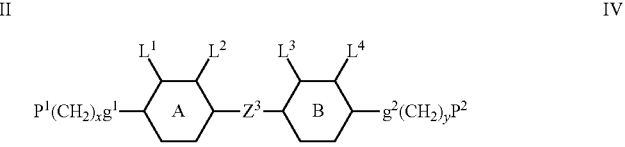

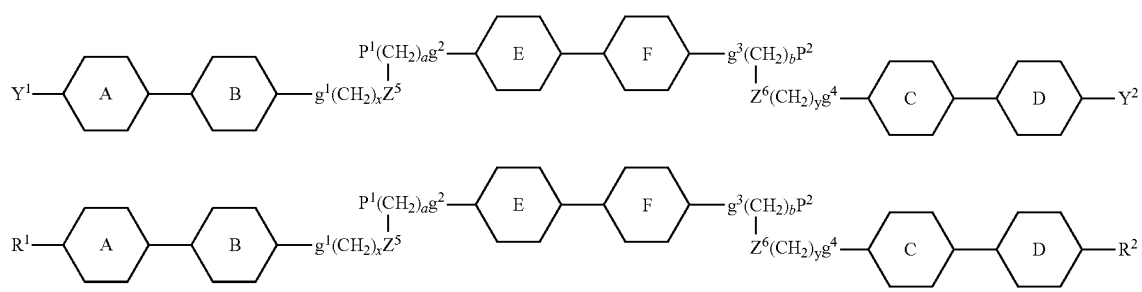

wherein
$P^1$, $P^2$ and $P^3$ are independently of each other a polymerisable group,
$Z^1$ and $Z^2$ are independently of each other, —O—, —S—, —CO—, —COO—, —OCO—, —O—COO—, —OCH$_2$—, —CH$_2$O—, —CH$_2$CH$_2$—, —C≡C—, —CH═CH—COO—, —OCO—CH═CH— or a single bond,
$Z^3$ and $Z^4$ are independently of each other —COO—, —OCO—, —CH$_2$CH$_2$—, —CH$_2$O—, —OCH$_2$—, —CH═CH—, —CH═CH—, —C≡C— or a single bond,
$Z^5$ and $Z^6$ are independently of each other —O—, —COO—, —OCO—, —CH$_2$CH$_2$—, —CH$_2$O—, —OCH$_2$— or a single bond,
$Y^1$ and $Y^2$ are independently of each other a polar group,
$R^1$ and $R^2$ are independently of each other an unpolar alkyl or alkoxy group,
A, B, C and D are independently of each other 1,4-phenylene that is optionally mono- di or trisubstituted by $L^1$, $L^2$, $L^3$, $L^4$, $L^5$, $L^9$ or 1,4-cyclohexylene,
$L^1$, $L^2$, $L^3$, $L^4$, $L^5$ and $L^6$ are independently of each other H, F, Cl, CN or an optionally halogenated alkyl, alkoxy, alkylcarbonyl, alkoxycarbonyl or alkoxycarbonyloxy group with 1 to 7 C atoms,
r is 0, 1, 2, 3 or 4,
x and y are each independently an integer from 1 to 12,
z is 1, 2 or 3, and
$g^1$, $g^2$, $g^3$ and $g^4$ are independently of each other a single bond, —O—, —COO— or —OCO—.

(2) Solvent cast polyimide films having the general formula A

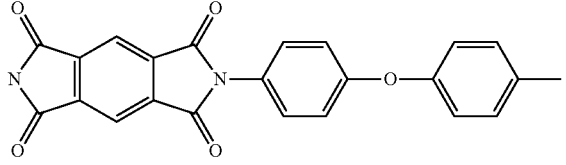

which in a preferred embodiment do also comprise one or more RMs of formula I-VI as defined above.

(3) Polymer films which are effectively plasticized with one or more RMs as defined above and below, in particular one or mire RMs of formula I-VI.

'Plasticized' means that the RM(s) is(are) added to the polymer, similar to adding a plasticizer, to improve processability of the polymer, e.g. by lowering Tg, reducing stiffness and improving processability.

This is in contrast to the films of preferred embodiment (1) above, where the RMs are added to the polymer precursor before polymerisation.

(4) Solvent cast cellulose based films, like for example triacetate cellulose (TAC) or diacetate cellulose (DAC) films, which preferably comprise one or more RMs of formula I-VI.

(5) Command layers comprising one or more compounds selected from photochromic or isomerisable compounds, chromophores and dyes, wherein changes of the chemical structure and/or the orientational directions of these compounds induce a specific alignment, or change the original alignment, of an LC material coated onto said layer. These layers preferably comprise one or more RMs of formula I-VI dispersed throughout the layer.

These command layers are typically not polymer layers, but self-assembled monolayer or multilayers. Thus, the promotion of alignment of LC material by a command layer is typically not a bulk effect, but a surface effect, where the command layer molecules are tethered to the surface and are usually only a monolayer thick.

Suitable and preferred photochromic or isomerisable compounds in the command layer are for example non-polymerisable monomeric compounds that have been modified to bind to the substrate by either chemical (e.g. siloxane/glass, thiol/gold) or physical (e.g. hydrogen bonding) bonds and which also interact with polarised UV to yield a command layer. For example, when irradiated with polarised UV light, layers composed of these materials can promote a specific alignment of LC molecules.

Such compounds are known in the art. Examples of suitable and preferred compounds include derivatives of azobenzene, stilbenes, spiropyran, spirooxadines, α-hydrazono-β-ketoesters, cinnamate, retinylidene, chalcone, coumarins, benzylidenephthalimidines, benzylideneacetophenones, diphenylacetylene or stilbazoles [as described for example in the review article by K. Ichimura *Chemical Reviews* (2000), 100, 1847.

Especially suitable and preferred monomeric compounds, which are also described in the above article of Ichimura, are for example azo compounds of the following formulae

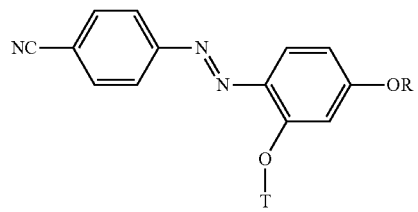

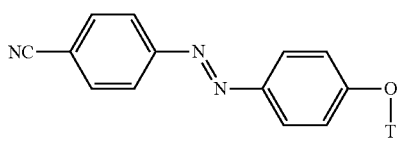

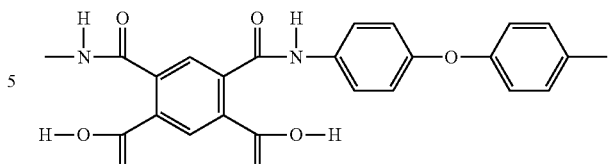

wherein R is an alkyl group and T is a group used to bind the molecule to the surface, which typically comprises a flexible spacer group, like an alkyl chain that is terminated with a specific group for binding to the surface, like for example a siloxane or —SH group.

For example, a command layer comprising one or more compounds of formula VII after irradiation with polarised light promotes in-plane alignment of LC molecules, whereas a command layer comprising one or more compounds of formula VIII after irradiation with polarised light promotes homeotropic alignment.

Preferred alignment layers according to this invention are polyimide (PI) films obtained from polyimide precursors. These films have the following advantages: (i) it is relatively simple to incorporate the RM into the precursor solution, (ii) dissolving both the RM and precursors in the same solution offers a simple method of premixing the materials before imidization, thus providing greater entanglement of the RM in the polyimide than obtained by mixing the polyimide and the RM together, (iii) polyimide precursor solutions are widely used in the display industry.

An alignment layer according to the present invention is characterized in that one or more RMs, preferably of formula I-VI, are incorporated into the precursor material of the layer before it is processed or polymerised, e.g. in case of polyimide films by adding the compounds into the pre-imidized polyimide solution. This requires RMs which are miscible with the substrate materials, such that they are well dispersed throughout it. When the polymer layer is subsequently being formed the RM is physically trapped. This provides an alignment layer which contains several reactive sites and improved adhesion between the alignment layer and a polymerised LC material coated thereon, in particular if the polymerised LC material is obtained from RMs that are similar to those of formula I-VI above.

As precursor for the alignment layer in principle any precursor known in prior art can be used. These materials are commercially available in a broad variety, for example polyimide precursors are available from JSR Co. (Japan).

Suitable precursor materials for polyimide films are for example non-photosensitive precursors, the typical chemical structure of which is represented by the following formula B or photosensitive precursors, the typical chemical structure of which is represented by the following formula C

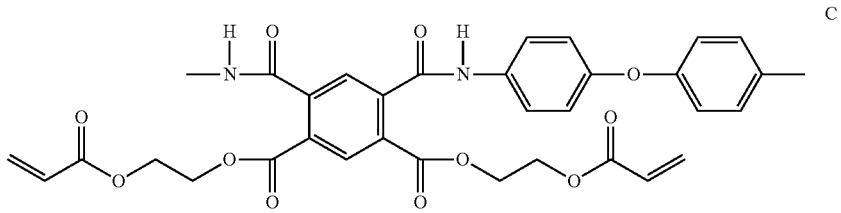 [SMILES: C=CC(=O)OCCOC(=O)c1cc(C(=O)OCCOC(=O)C=C)c(C(=O)Nc2ccc(Oc3ccc(C)cc3)cc2)cc1C(=O)NC]

For some practical applications the polyimide precursor may also possess different lateral substituted groups, in order to improve solubility of the material or to influence the surface energy of the material. For example a polyimide precursor comprising perfluorocarbon chains is preferred for polyimides used to help promote homeotropic alignment of liquid crystals. The structures above are given only as general examples to help explain this invention and are not meant to restrict this invention.

Especially preferred precursor materials for this invention are non-photosensitive polyimide precursors.

The preferred range of concentration of the RMs, in particular the compounds of formula I-VI, in the precursor material of the alignment layer is from 0.5 to 4%, preferably from 1% to 2% by weight.

Processing of a polymer alignment layer according to the invention comprising one or more RMs is typically carried out by providing a solution of the polymer and the RM onto a substrate, which is heated and baked to remove excess solvent and allowed to cool to ambient temperature. The polymer can then be subjected to mechanical treatment, like rubbing, to provide a preferred orientation direction for the LC material coated thereon.

A preferred process relates to spincoating a solution of polyimide precursors and one or more RMs of for I-VI onto clean glass slides, heating the slides, for example at approx. 100° C. for several tens of seconds to one or 2 minutes, in order to remove excess solvent and baking the slides, for example at approx. 180° C. for several tens of minutes to 1 to 2 hours, in order to imidize. The slides are then allowed to cool to ambient temperature and the resulting polyimide layer is rubbed for example with a velvet cloth.

The RMs should be miscible with the polymer. Furthermore, the temperatures of processing the polymer film should not destroy the polymerisable group of the RM.

The RMs can be present in monomeric, oligomeric or polymeric form in the final alignment layer.

The term 'oligomer' in prior art usually means a compound with a small number of monomeric or repeating units, whereas the term 'polymer' usually refers to a compound having a higher number of monomeric or repeating units. The boundaries between these terms are usually not fixed. In the sense of this invention, 'oligomeric' means a compound having at least 2, but not more than from 15 to 50, preferably not more than from 20 to 30, very preferably not more than 25 monomeric or repeating units, and the term 'polymeric' means a compound having a higher number of monomeric or repeating units than that defined for the oligomeric compound. These repeating units can be identical or, e.g. in case of a copolymerisate of different RMs, can be different.

Preferably processing of the alignment layer material is carried out such that after preparation of the alignment layer there are still some unreacted polymerisable groups in the RM additive which can then react with a subsequent LC layer coated onto the alignment layer.

When the RMs are polymerised, for example during baking of the alignment layer, the number of non-reacted polymerisable groups relative to the repeat unit of the mesogenic core of an RM decreases with increasing molecular weight of the polymer formed by the RMs. On the ether hand, the chance of entanglement of the RM additive in the polymer of the alignment layer increases. Therefore monomeric and oligomeric forms of the RMs are especially preferred, whereas polymeric forms are possible but less preferred.

Preferably, the RMs remain non-polymerised throughout the alignment layer processing and are only polymerised when a subsequent LC layer coated onto the alignment layer is polymerised. In this way the RM additive is entangled in the material forming the alignment layer, and can then be polymerised (chemically bound) to the subsequent LC layer. However, it is also possible that the RM additive undergoes polymerisation to a certain degree within the alignment layer before the subsequent LC layer is added.

Especially preferably the RM(s) is(are) present in monomeric or oligomeric form in the alignment layer after its preparation, i.e. before a subsequent LC layer is coated onto the alignment layer.

In case a polymerisable LC material is coated onto the alignment layer, the unreacted RMs can then be copolymerised with the polymerisable LC material, for example according to known methods that are also described below for the polymerisable LC material itself.

Also, the RM should not hinder the aligning capability of the polymer film. Thus, for example in a photoalignment layer the UV absorption of the RM should not interfere with that of the photoalignment layer.

Especially preferred are RMs comprising a mesogenic group that is linked, optionally by a spacer group, to one or more polymerisable group. Especially preferred are RMs with two similar, preferably two identical, terminal groups. These are beneficial because their symmetric structure allows their alignment to be influenced by the alignment layer, whereas non-symmetrical RMs are 'surfactant-like' and so have a propensity for homeotropic alignment over planar alignment. Compounds comprising two or yore polymerisable groups (multireactive or multifunctional compounds), like e.g diacrylate or triacrylate RMs, are preferred because they contain two or three polymerisable groups for possible reaction into a subsequent layer and can be synthesised to have similar terminally substituted groups.

Especially preferred are RMs of formula I-VI above.

The term 'polar group' in formula I-VI means a group selected from F, Cl, CN, $NO_2$, OH, $OCH_3$, OCN, SCN, an optionally fluorinated carbonyl or carboxyl group with up to 4 C atoms or a mono- oligo- or polyfluorinated alkyl or alkoxy group with 1 to 4 C atoms.

The term 'unpolar group' in formula I-VI means an alkyl group with 1 or more, preferably 1 to 12 C atoms or an alkoxy group with 2 or more, preferably 2 to 12 C atoms.

The polymerizable or reactive groups $P^1$, $P^2$ and $P^3$ in formula I-VI are preferably selected from a vinyl group, an acrylate group, a methacrylate group, an oxetane group or an epoxy group, especially preferably an acrylate group.

$P^1$, $P^2$ and $P^3$ in one compound can be identical or different. Preferably they are identical, x and y in formula I-VI can be identical or different. Preferably they are identical. Another preferred embodiment of the present invention relates to compounds wherein x and y are different.

Another preferred embodiment relates to a mixture comprising at least two compounds, each having identical groups $P^{1-3}$, $Z^{1-6}$, $L^{1-6}$ and r, but wherein x and y are different.

Especially preferred are compounds of formula I-VI wherein $L^{1-6}$ are selected from F, Cl, CN, $CH_3$, $C_2H_5$, $OCH_3$, $OC_2H_5$, $COCH_3$, $COC_2H_5$, $COOCH_3$, $COOC_2H_5$, $CH_3$ and $OCH_3$.

Further preferred are compounds of formula wherein $Z^1$ and $Z^2$ are selected from —COO—, —OCO—, —$CH_2CH_2$— or a single bond.

Examples of suitable and preferred RM materials are:

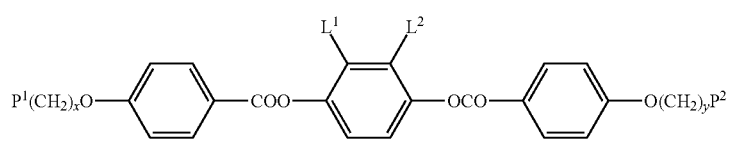

Ia

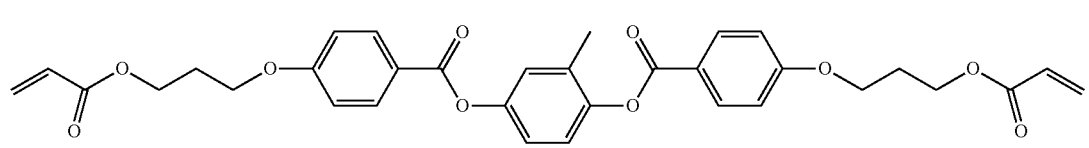

IIa

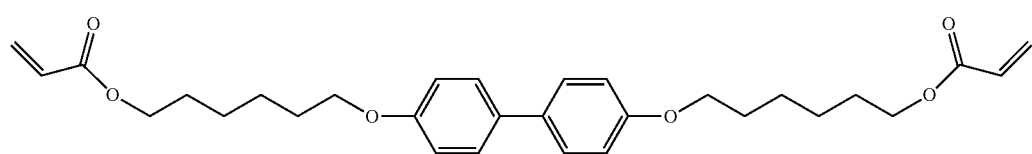

IVa

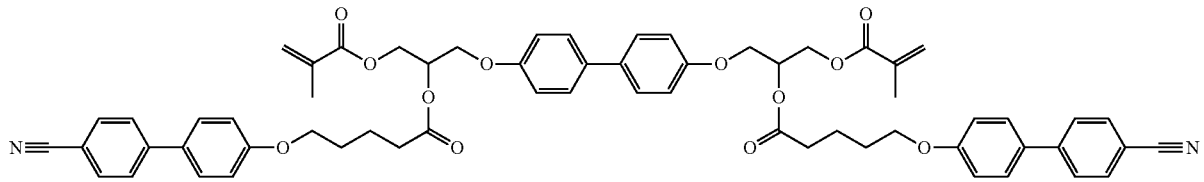

Va wherein $P^1$, $P^2$, x, y, $L^1$ and $L^2$ are as defined above. In formula Ia $P^1$ and $P^2$ are preferably acrylate, $L^1$ and $L^2$ are preferably H, $CH_3$ or $OCH_3$, and x and y are preferably integers from 3 to 6.

The compound of formula Va is disclosed for example in WO 97/14674. Some of the compounds of formula III are disclosed for example in JP 2002-348319

The thickness of an alignment layer according to the present invention is preferably from 15 nm to 50 nm.

The LC films provided on the alignment layer, or formed on the alignment layer as part of the inventive laminate, are preferably prepared from a polymerisable LC material by in-situ polymerisation. In a preferred method of preparation a polymerisable LC material is coated onto the alignment layer acting as a substrate, oriented into the desired orientation and subsequently polymerised for example by exposure to heat or actinic radiation as described for example in WO 01/20394, GB 2,315,072 or WO 98/04651.

Preferably the alignment layer is rubbed unidirectionally before being coated with the LC material.

If a polymerisable LC material is used, it preferably comprises one or more polymerisable chiral or achiral mesogenic or liquid crystalline compounds. It is preferably a mixture comprising one or more polymerisable compounds having one polymerisable group (monoreactive) and one or more polymerisable compound having two or more polymerisable groups (di- or multireactive).

In another preferred embodiment the polymerisable LC material comprises up to 20% of a monoreactive non-mesogenic compound with one polymerisable functional group. Typical examples are alkyl acrylates or alkyl methacrylates with alkyl groups of 1 to 20 C atoms.

In another preferred embodiment the polymerisable LC material used for the preparation of the low crosslinked film does not contain compounds having more than two polymerisable groups.

In another preferred embodiment the polymerisable LC material used for the preparation of the low crosslinked film is an achiral material, i.e. it does not contain chiral compounds.

The polymerisable compounds and polymerisable mesogenic compounds referred to above and below are preferably monomers.

The non-polymerisable compounds include for example additives like surfactants, catalysts, sensitizers, stabilizers, chain-transfer agents, inhibitors, lubricating agents, wetting agents, dispersing agents, hydrophobing agents, adhesive agents, flow improvers, defoaming agents, deaerators, diluents, reactive diluents, colourants, dyes or other auxiliaries.

In case of high crosslinked LC films it is also possible to add up to 20% of a non mesogenic compound with two or more polymerisable functional groups to the polymerisable LC material alternatively or in addition to the di- or multireactive polymerisable mesogenic compounds to increase the degree of crosslinking. Typical examples for direactive non-mesogenic monomers are alkyl diacrylates or alkyl dimethacrylates with alkyl groups of 1 to 20 C atoms. Typical examples for multireactive non-mesogenic monomers are trimethylpropane trimethacrylate or pentaerythritol tetraacrylate.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers together with the compounds according to the present invention in a polymerizable LC mixture, are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful chiral and achiral polymerizable mesogenic compounds (reactive mesogens) are shown in the following lists which should, however, be taken only as illustrative and is in no way intended to restrict, but instead to explain the present invention:

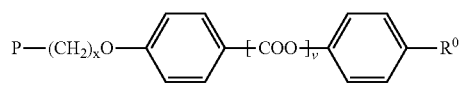

(R1)

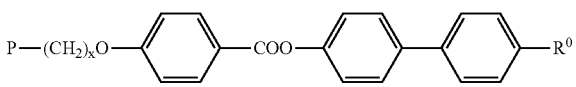

(R2)

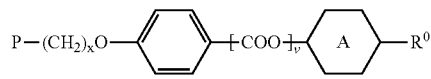

(R3)

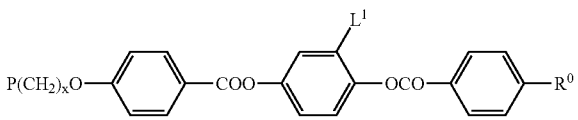

(R4)

(R5) 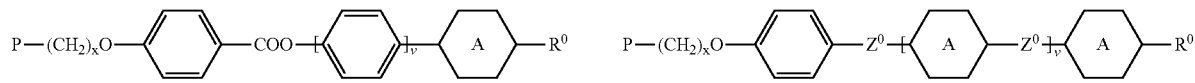
(R6) 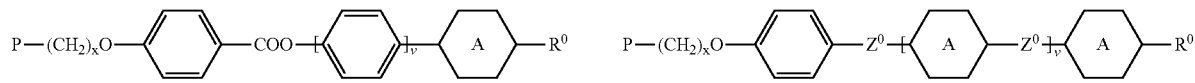
(R7) 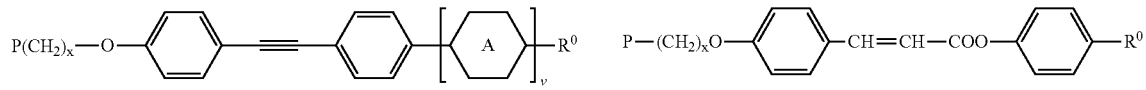
(R8) 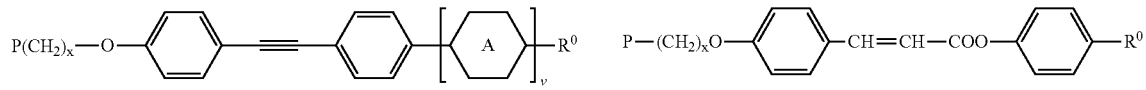
(R9) 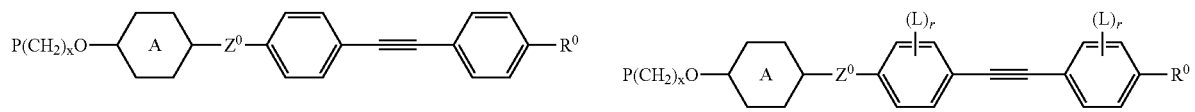
(R10) 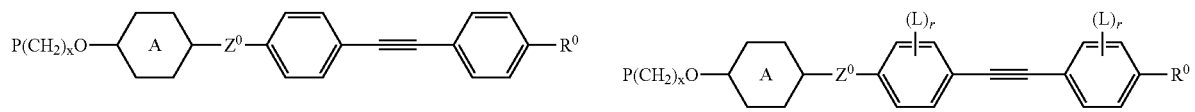
(R11) 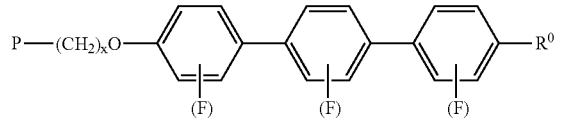
(R12) 
(R13) 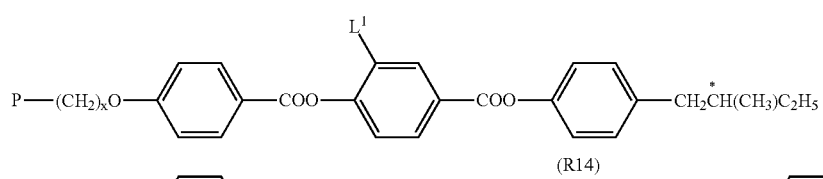
(R14) 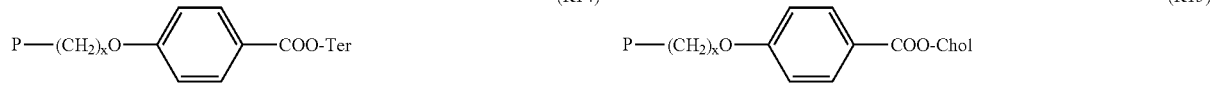
(R15) 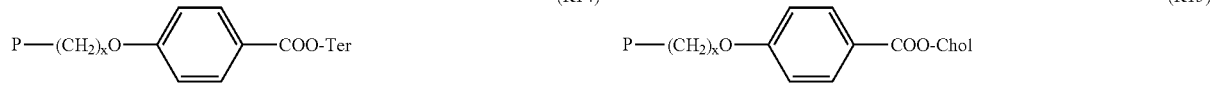
(R16) 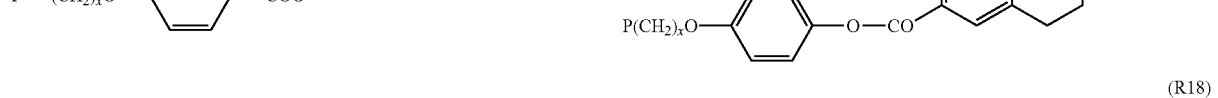
(R17) 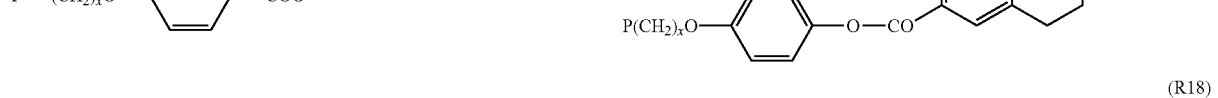
(R18) 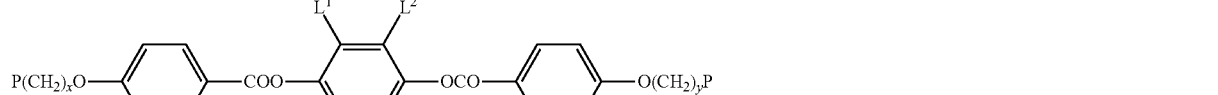
(R19) 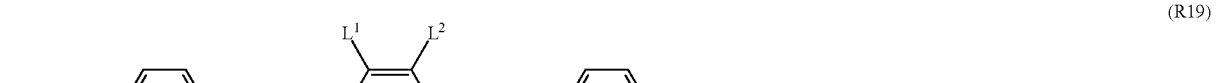
(R20) 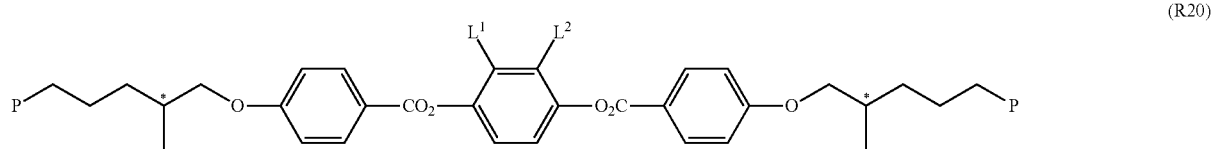

-continued

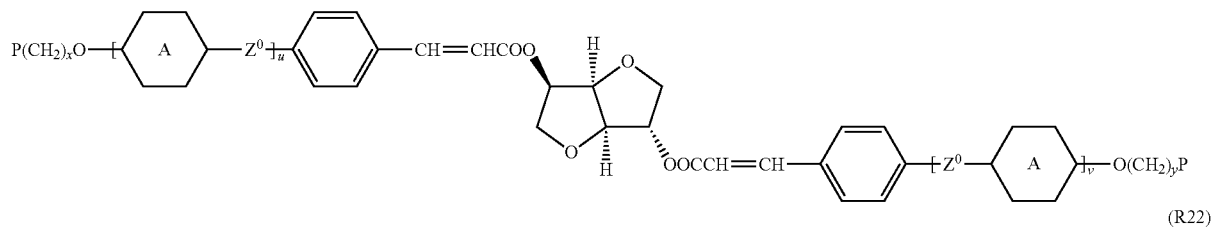
(R21)

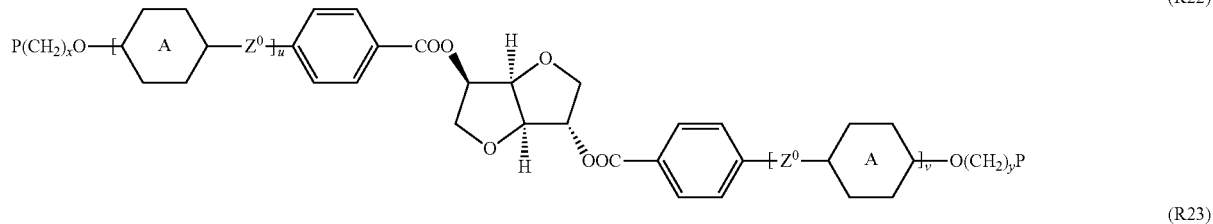
(R22)

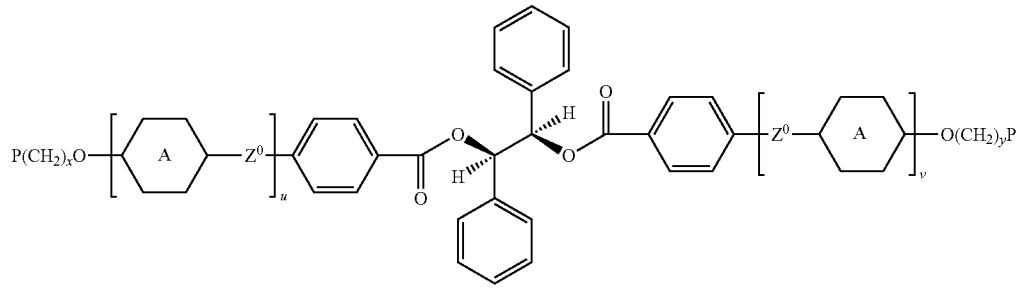
(R23)

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are Independently of each other 0 or 1, $Z^0$ is —COO—, —OCO—, —CH$_2$CH$_2$—, —CH=CH—, —C≡C— or a single bond, $R^0$ is a polar group or an unpolar group, Ter is a terpenoid radical like e.g. menthyl, Chol is a cholesteryl group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

For the preparation of cholesteric LC films with helically twisted structure, the polymerisable LC material preferably comprises one or more achiral polymerisable mesogenic compounds and at least one chiral compound. The chiral compound can be selected from non-polymerisable chiral compounds, like e.g. conventional chiral dopants, or polymerisable chiral compounds, all of which can be mesogenic or non-mesogenic.

Suitable polymerisable chiral compounds are for example those shown in the above list. Further suitable chiral polymerisable compounds are e.g. the commercially available Paliocolour® materials (from BASF AG, Germany).

Suitable chiral dopants can be selected e.g. from the commercially available R- or S-811, R- or S-1011, R- or S-2011, R- or S-3011, R- or S-4011, R- or S-5011, or CB 15 (from Merck KGaA, Darmstadt, Germany). Very preferred are chiral compounds with a high helical twisting power (HTP), in particular compounds comprising a sorbitol group as described in WO 98/00428, compounds comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195.

The polymerisable material is preferably dissolved or dispersed in a solvent, preferably in an organic solvent. The solution or dispersion is then coated onto the substrate, for example by spin-coating or other known techniques, and the solvent is evaporated off before polymerisation. In most cases it is suitable to heat the mixture in order to facilitate the evaporation of the solvent.

The polymerisable LC material may additionally comprise a polymeric binder or one or more monomers capable of forming a polymeric binder and/or one or more dispersion auxiliaries. Suitable binders and dispersion auxiliaries are disclosed for example in WO 96/02597. Especially preferred, however, are LC materials not containing a binder or dispersion auxiliary.

In another preferred embodiment the polymerisable LC material comprises an additive that induces or enhances planar alignment of the liquid crystal material on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very preferably fluorocarbon surfactants, like for example the commercially available fluorocarbon surfactants Fluorad FC-171® (from 3M Co.) or Zonyl FSN® (from DuPont) or the compounds described in G 2 383 040.

The polymerisation of the RMs in the alignment layer as well as the polymerisation of a LC material coated onto said alignment layer is preferably carried out according to the methods described above and below.

Generally, polymerisation is preferably achieved by exposing it to actinic radiation. Actinic radiation means irradiation with light, like UV light, IR light or visible light, irradiation with X-rays or gamma rays or irradiation with high energy particles, such as ions or electrons. Preferably polymerisation is carried out by photoirradiation, in particular with UV light. As a source for actinic radiation for example a single UV lamp or a set of UV lamps can be used. When using a high lamp power the curing time can be reduced. Another possible source for photoradiation is a laser, like e.g. a UV laser, an IR laser or a visible laser.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. UV photoinitiator 5 are preferred, in particular radicalic UV photoinitiators. As standard photoinitiator for radical polymerisation for example the commercially available Irgacure® or Darocure® series (all from Ciba Geigy AG) can be used, whereas in case of cationic photopolymerisation the commercially available UVI 6974 (Union Carbide) can be used.

The polymerisable LC material can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

it is also possible to add one or more chain transfer agents to the polymerisable material in order to modify the physical properties of the polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

The alignment layers according to the present invention are particularly useful as alignment layers or substrates for the preparation of LC films, in particular polymerised LC films.

The laminates according to the present invention are useful as optical elements like polarisers, compensators, circular polarisers or colour filters in liquid crystal displays or projection systems, as decorative image, for the preparation of liquid crystal or effect pigments, and especially as reflective film with spatially varying reflection colours, e.g. as multicolour image for decorative, information storage or security uses, such as non-forgeable documents like identity or credit cards, banknotes etc.

The laminates according to the present invention can be used in displays of the transmissive or reflective type. They can be used in conventional LCDs, in particular those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB and pi-cell displays.

The examples below serve to illustrate the invention without limiting it. In the foregoing and the following, all temperatures are given in degrees Celsius, and all percentages are by weight, unless stated otherwise.

Example 1

The Reactive Mesogen (1)

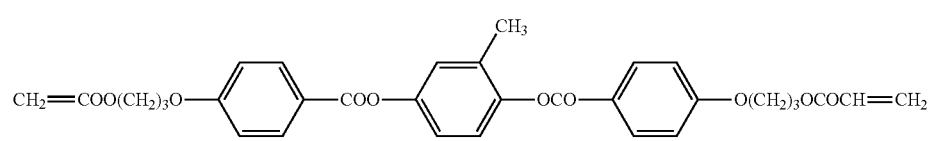

was added in different concentrations to a pre-imidized solution (AL1054 of JSR Co) and spincoated (3,000 RPM; 30 s) onto clean glass slides. Immediately after spin-coating the films were dried (100° C., 60 s) and imidized by baking at 180° C. for 90 minutes. The resulting polyimide films were rubbed with a velvet cloth (22 cm rub length) to provide alignment layers for subsequent RM layers, The polymerisable LC mixture M1 was formulated as follows:

| M1: | |
|---|---|
| (1) | 39.4% |
| (2) | 24.6% |
| (3) | 24.6% |
| (4) | 9.7% |
| Irgacure651 | 1.0% |
| Fluorad FC171 | 0.6% |
| Irganox1076 | 0.1% |

$CH_2$=$CHCO_2(CH_2)_3O$—⟨⟩—COO—⟨CH_3⟩—OCO—⟨⟩—$O(CH_2)_3O_2CCH$=$CH_2$ (1)

$CH_2$=$CHCOO(CH_2)_6O$—⟨⟩—COO—⟨⟩—CN (2)

$CH_2$=$CHCOO(CH_2)_6O$—⟨⟩—COO—⟨⟩—$OCH_3$ (3)

$CH_2$=$CHCO_2(CH_2)_6O$—⟨⟩—COO—⟨CH_3⟩—OCO—⟨⟩—$O(CH_2)_6O_2CCH$=$CH_2$ (4)

Irgacure651® is a photoinitiator, Irganox1076® a stabilizer, both being commercially available (Ciba AG, Basel, Switzerland). FC171® is a non-ionic fluorocarbon surfactant (from 3M Co.).

A solution of polymerisable mixture M1 (50%) in xylene was deposited by spincoating onto the different rubbed polyimide layers and subsequently photopolymerised (20 mW cm$^{-2}$, 60 s, $N_2$) to give a polymerised LC film.

The adhesion of the polymerised LC film to the polyimide layers was tested using the Scotch #610 tape test. The 610 tape was applied over the RM film and removed sharply. The adhesion was deemed to pass if none of the film was removed. Each film was tested 5 times. The results are summarized in table 1:

TABLE 1

| % of (1) in polyimide | 0 | 1 | 5 | 10 |
|---|---|---|---|---|
| Alignment[1] | good | good | poor | poor[3] |
| Summary[2] | fail | pass | pass | pass |

[1]Alignment Quality of M1 on Polyimide
[2]Summarized result of 610 Tape test
[3]Scattering Film The results show that adding a small amount of reactive mesogen of formula I to the polyimide precursor promotes adhesion between the polymerised LC layer and the polyimide film, whilst giving clear, transparent, highly oriented films.

Comparison Example

The experiment as described in Example 1 was repeated using 1% of HDDA (hexanediol diacrylate) and TMPTA (trimethylolpropane triacrylate), respectively, instead of compound (1). The resulting polyimide films showed phase separation of the acrylate materials and were optically scattering.

The invention claimed is:

1. A method for preparing an alignment layer for aligning liquid crystal molecules, and a layer of liquid crystal molecules aligned by the alignment layer, said alignment layer comprising: (a) a polymer film formed from a polymer or from a polymer precursor and (b) at least one reactive mesogen additive in monomeric, oligomeric or polymeric form within said polymer film, wherein said at least one reactive mesogen additive is not said polymer or said polymer precursor used to form said polymer film, and wherein, after preparation of said alignment layer, said alignment layer contains unreacted polymerizable groups in said at least one reactive mesogen additive, said method comprising:
depositing a layer of a solution onto a surface, said solution containing said polymer or polymer precursor, processing said layer of solution to form said alignment layer, and applying a layer of liquid crystal molecules onto said formed alignment layer, thereby aligning the liquid crystal molecules, wherein said at least one reactive mesogen additive is incorporated into said layer of solution before said processing, and wherein the concentration of said at least one reactive mesogen additive in said polymer or polymer precursor is 0.5 to 4% by weight.

2. A method according to claim 1, wherein said at least one reactive mesogen additive is present in monomeric or oligomeric form in the alignment layer after the preparation of said alignment layer.

3. A method according to claim 2, wherein said at least one reactive mesogen additive is present in monomeric form in the alignment layer after the preparation of said alignment layer.

4. A method according to claim 1, wherein said alignment layer is obtained from a polymer precursor comprising at least one reactive mesogen.

5. A method according to claim 1, wherein said alignment layer comprises a polyimide film and said at least one reactive mesogen additive within said polyimide film, and said alignment layer is obtained from a solution comprising a polyimide precursor and said at least one reactive mesogen additive.

6. A method according to claim 5, wherein said polyimide film has repeating units of formula A

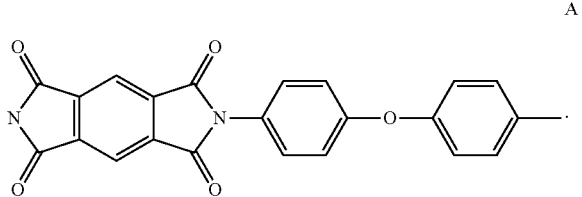

A

7. A method according to claim 1, wherein said at least one reactive mesogen additive is of one of the following formulae:

wherein
P$^1$, P$^2$ and P$^3$ are each, independently of each other, a polymerizable group, Z$^1$ and Z$^2$ are each, independently of each other, —O—, —S—, —CO—, —COO—, —OCO—, —O—OCO—, —OCH$_2$—, —CH$_2$O—, —CH$_2$CH$_2$—, —C≡C—, —CH=CH—COO—, —OCO—CH=CH— or a single bond, Z$^3$ and Z$^4$ are each, independently of each other, —COO—, —OCO—, —CH$_2$CH$_2$—, —CH$_2$O—, —OCH$_2$—, —CH=CH—, —CH=CH—, —C≡C— or a single bond, Z$^5$ and Z$^6$ are each, independently of each other, —O—, —COO—, —OCO—, —CH$_2$CH$_2$—, —CH$_2$O—, —OCH$_2$— or a single bond, Y$^1$ and Y$^2$ are each, independently of each other, a polar group, R$^1$ and R$^2$ are each, independently of each other, an unpolar alkyl or alkoxy group, A, B, C and D are each, independently of each other, 1,4-phenylene that is optionally mono-, di- or trisubstituted by L$^1$, L$^2$, L$^3$, L$^4$, L$^5$, L$^6$ or 1,4-cyclohexylene, L$^1$, L$^2$, L$^3$, L$^4$, L$^5$ and L$^6$ are each, independently of each other, H, F, Cl, CN or an optionally halogenated alkyl,

I

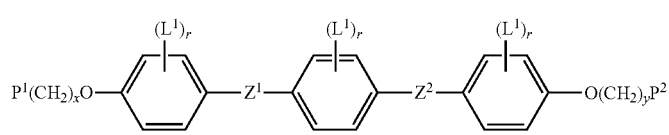

II

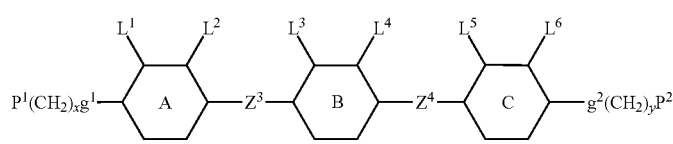

III

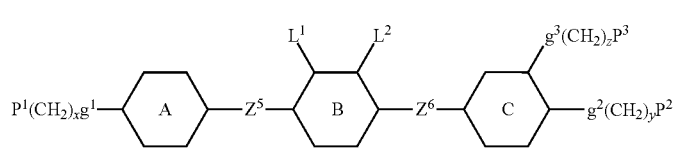

IV

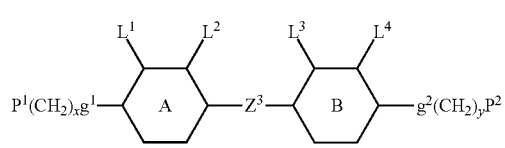

V

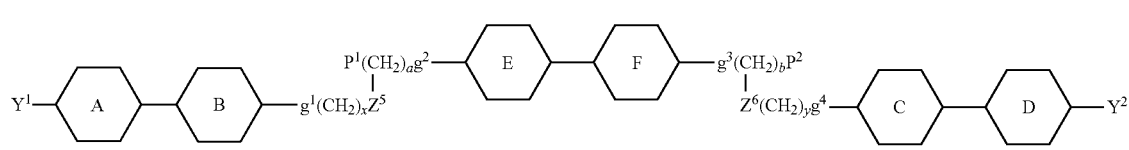

VI

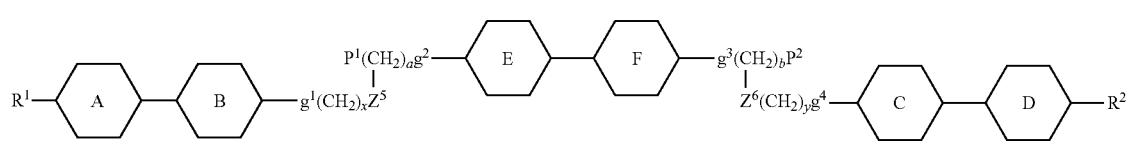

alkoxy, alkylcarbonyl, alkoxycarbonyl or alkoxycarbonyloxy group with 1 to 7 C atoms, r is 0, 1, 2, 3 or 4, x and y are each, independently of each other, an integer from 1 to 12, z is 1, 2 or 3, and $g^1$, $g^2$, $g^3$ and $g^4$ are each, independently of each other, a single bond, —O—, —COO— or —OCO—.

8. A method according to claim 7, wherein the concentration of said at least one reactive mesogen in said polymer or polymer precursor is 1 to 2% by weight.

9. A method according to claim 1, wherein said alignment layer has a birefringence of less than 0.05.

10. A method according to claim 1, wherein said alignment layer has a birefringence of less than 0.005.

11. A method according to claim 1, wherein said at least one reactive mesogen is added to a solution of said polymer or said polymer precursor.

12. A method according to claim 1, wherein the concentration of said at least one reactive mesogen in said polymer or polymer precursor is comprises 1 to 2% by weight.

13. A method according to claim 1, wherein, after said alignment layer is processed from said layer of solution, said at least one reactive mesogen is physically trapped within said polymer of said polymer film.

14. A method according to claim 13, wherein said alignment layer is obtained by applying to a substrate a solution of said polymer of said polymer film, and said solution further contains said at least one reactive mesogen, said solution being applied to said substrate, and processing of said alignment layer comprises heating said solution to remove excess solvent.

15. A method according to claim 1, wherein said alignment layer is obtained by applying to a substrate a solution comprising said at least one reactive mesogen and a polymer precursor for forming said polymer film, and processing of said alignment layer comprises subjecting said polymer precursor to polymerization.

16. A method according to claim 1, wherein the material of said alignment layer or precursor material thereof, before addition of said at least one reactive mesogen, is non-mesogenic and has a birefringence Δn of <0.01.

17. A method of preparing an optical, electrooptical, information storage, decorative or security device, said device having a layer of liquid crystal molecules, said method comprising: providing said device with an alignment layer for aligning the layer of liquid crystal molecules, wherein said alignment layer is prepared according to claim 1.

18. A method of preparing an optical component or device, said component or device having a layer of liquid crystal molecules, said method comprising: providing said component or device with at least one alignment layer for aligning the layer of liquid crystal molecules, wherein said at least one alignment layer is prepared according to claim 1.

19. A method of preparing liquid crystal display, said display having a layer of liquid crystal molecules, said method comprising: providing said display with at least one alignment layer for aligning the layer of liquid crystal molecules, wherein said at least one alignment layer is prepared according to claim 1.

20. A solution for preparing an alignment layer for aligning a layer of liquid crystal molecules, said alignment layer comprising: (a) a polymer film formed from a polymer or a polymer precursor and (b) at least one reactive mesogen additive in monomeric, oligomeric or polymeric form within said polymer film, wherein said at least one reactive mesogen additive is not said polymer or said polymer precursor used to form said polymer film, said solution comprising:

a solvent, said at least one reactive mesogen additive, and a polymer or a polymer precursor, said polymer or polymer precursor comprising: a polyimide polymer or a precursor of said polyimide polymer, wherein in said solution the concentration of said at least one reactive mesogen relative to said polymer or polymer precursor before forming said film is 0.5 to 4% by weight, and said at least one reactive mesogen additive is miscible with said polymer film formed from said polymer or polymer precursor, wherein said at least one reactive mesogen additive is one of the following formulae:

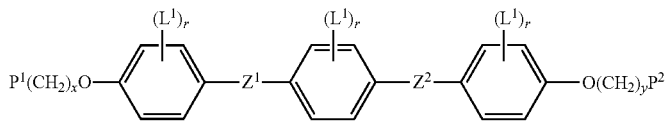

I

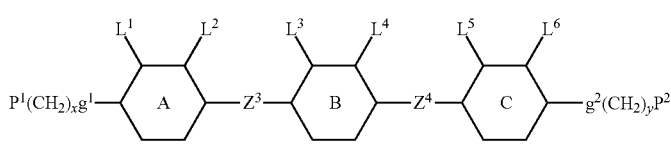

II

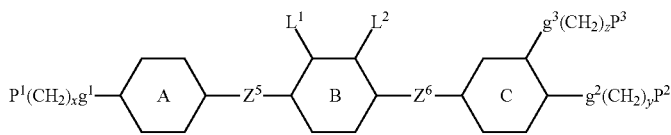

III

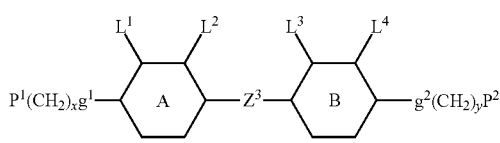

IV

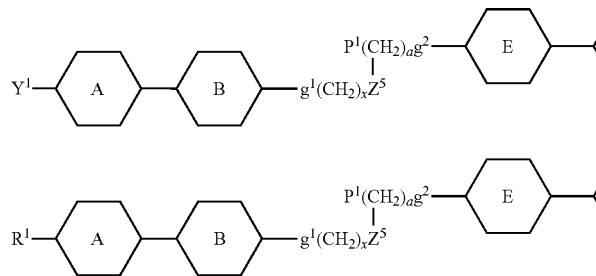

V

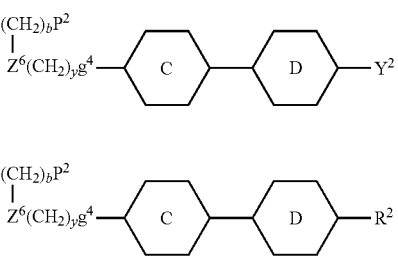

VI wherein
- $P^1$, $P^2$ and $P^3$ are each, independently of each other, a polymerizable group, $Z^1$ and $Z^2$ are each, independently of each other, —O—, —S—, —CO—, —COO—, —OCO—, —O—OCO—, —OCH$_2$—, —CH$_2$O—, —CH$_2$CH$_2$—, —C≡C—, —CH=CH—COO—, —OCO—CH=CH— or a single bond,
- $Z^3$ and $Z^4$ are each, independently of each other, —COO—, —OCO—, —CH$_2$CH$_2$—, —CH$_2$O—, —OCH$_2$—, —CH=CH—, —CH=CH—, —C≡C— or a single bond,
- $Z^5$ and $Z^6$ are each, independently of each other, —O—, —COO—, —OCO—, —CH$_2$CH$_2$—, —CH$_2$O—, —OCH$_2$— or a single bond,
- $Y^1$ and $Y^2$ are each, independently of each other, a polar group,
- $R^1$ and $R^2$ are each, independently of each other, an unpolar alkyl or alkoxy group,
- A, B, C and D are each, independently of each other, 1,4-phenylene that is optionally mono-, di- or trisubstituted by $L^1$, $L^2$, $L^3$, $L^4$, $L^5$, $L^6$ or 1,4-cyclohexylene,
- $L^1$, $L^2$, $L^3$, $L^4$, $L^5$ and $L^6$ are each, independently of each other, H, F, Cl, CN or an optionally halogenated alkyl, alkoxy, alkylcarbonyl, alkoxycarbonyl or alkoxycarbonyloxy group with 1 to 7 C atoms,
- r is 0, 1, 2, 3 or 4,
- x and y are each, independently of each other, an integer from 1 to 12,
- z is 1, 2 or 3, and
- $g^1$, $g^2$, $g^3$ and $g^4$ are each, independently of each other, a single bond, —O—, —COO— or —OCO—.

21. A solution according to claim 20, wherein said polymer or polymer precursor forms an alignment layer having birefringence of less than 0.05.

22. A solution according to claim 20, wherein said polymer or polymer precursor forms an alignment layer having birefringence of less than 0.005.

23. A solution according to claim 20, wherein said polymer or polymer precursor comprises 1 to 2% by weight of said at least one reactive mesogen.

24. A method for preparing an alignment layer for aligning liquid crystal molecules, and a layer of liquid crystal molecules aligned by the alignment layer, said alignment layer comprising: (a) a polymer film formed from a polymer or from a polymer precursor and (b) at least one reactive mesogen additive in monomeric, oligomeric or polymeric form within said polymer film, wherein said at least one reactive mesogen additive is not said polymer or polymer precursor used to form said polymer film, and wherein, after preparation of said alignment layer, said alignment layer contains unreacted polymerizable groups in said at least one reactive mesogen additive, said method comprising:
depositing a layer of a solution onto a surface, said solution containing said polymer or polymer precursor, processing said layer of solution to form said alignment layer, and applying a layer of liquid crystal molecules onto said formed alignment layer, thereby aligning the liquid crystal molecules, wherein said at least one reactive mesogen additive is incorporated into said layer of solution before said processing, the concentration of said at least one reactive mesogen additive in said polymer or polymer precursor is 0.5 to 4% by weight, and said at least one reactive mesogen additive is miscible with said polymer film formed from said polymer or polymer precursor.

* * * * *

UNITED STATES PATENT AND TRADEMARK OFFICE
CERTIFICATE OF CORRECTION

PATENT NO. : 8,481,130 B2
APPLICATION NO. : 13/614733
DATED : July 9, 2013
INVENTOR(S) : Richard Harding et al.

Page 1 of 1

It is certified that error appears in the above-identified patent and that said Letters Patent is hereby corrected as shown below:

In the Claims

Column 22, line 10 (Claim 7), reads as follows: "-CH=CH-, -CH=CH-, -C≡C- or a single"

Should read: -- -CH=CH-, -CF=CF-, -C≡C- or a single --.

Column 25, line 25 (Claim 20), reads as follows: "-CH=CH-, -CH=CH-, -C≡C- or a single"

Should read: -- -CH=CH-, -CF=CF-, -C≡C- or a single --.

Signed and Sealed this
Twenty-ninth Day of October, 2013

Teresa Stanek Rea
*Deputy Director of the United States Patent and Trademark Office*